Dec. 3, 1940.   J. A. LANDRY   2,223,490
TRACK LAYING VEHICLE
Filed April 22, 1939   3 Sheets-Sheet 1
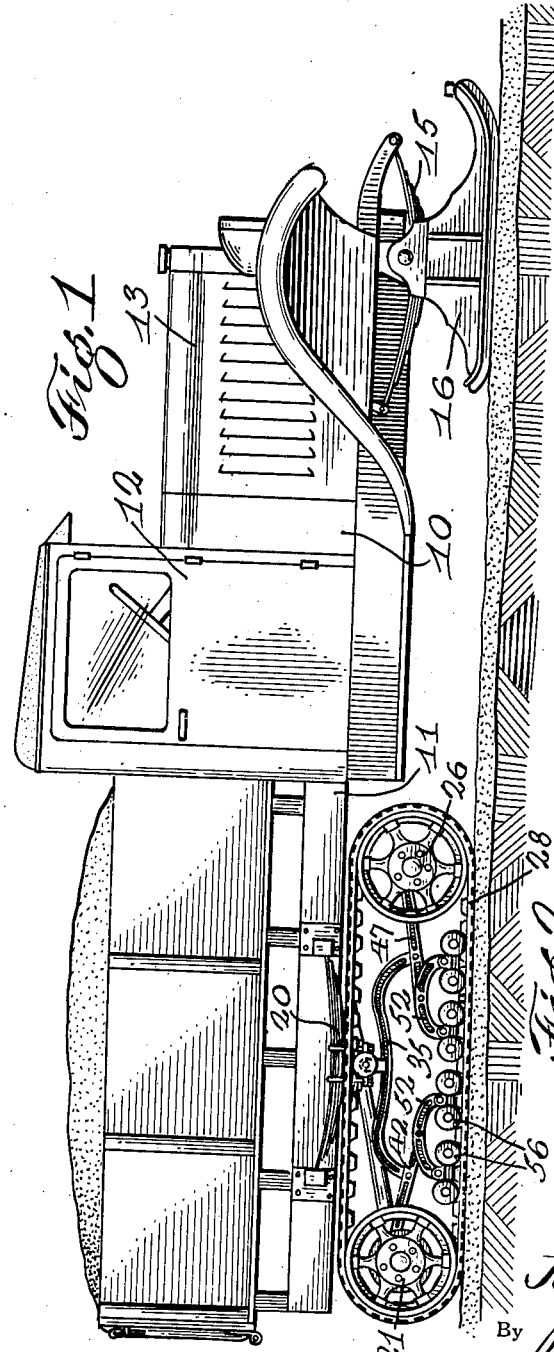
Inventor
Joseph A. Landry
By  Bovic & Bastien
Attorneys

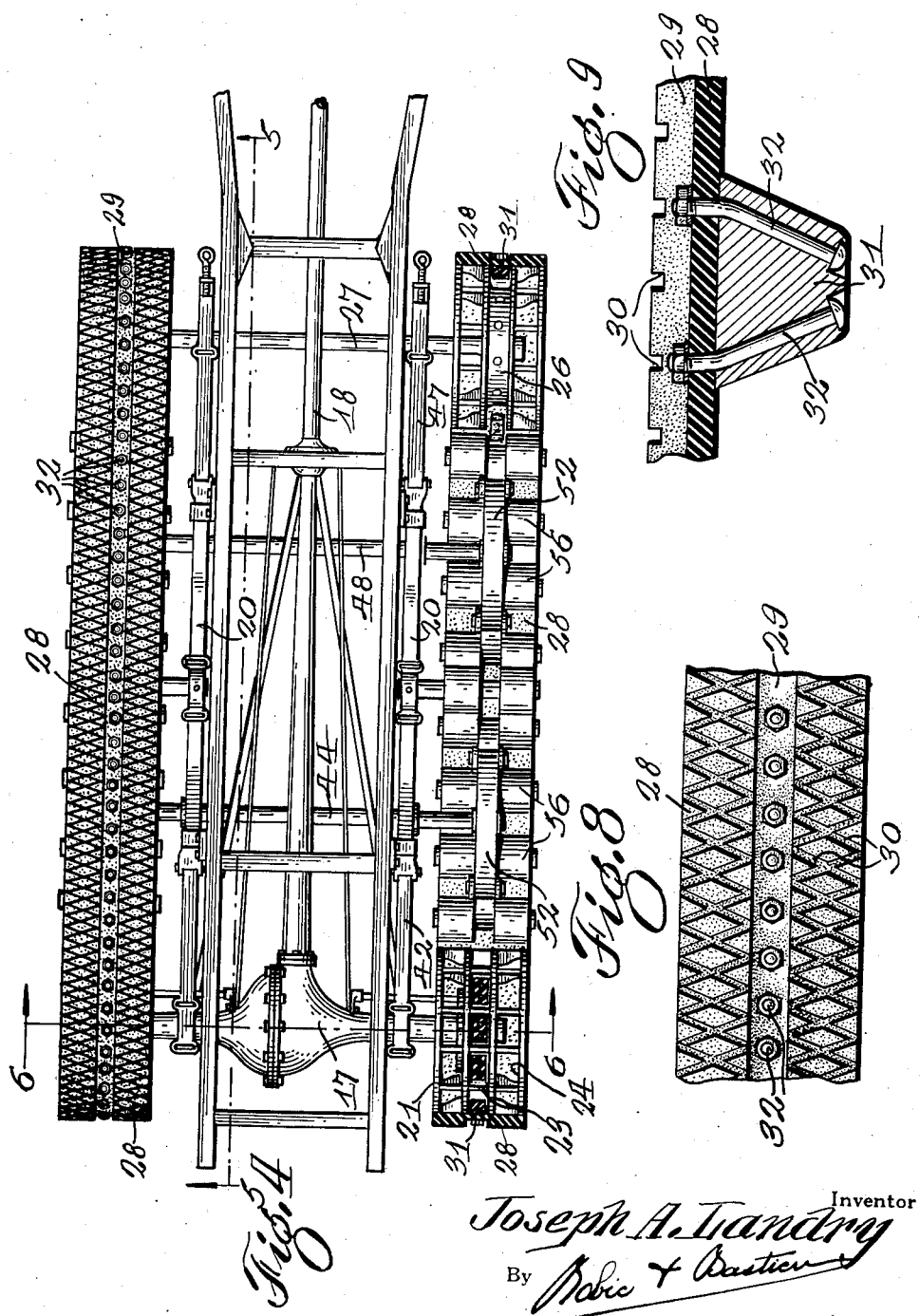

Dec. 3, 1940.   J. A. LANDRY   2,223,490
TRACK LAYING VEHICLE
Filed April 22, 1939   3 Sheets-Sheet 3
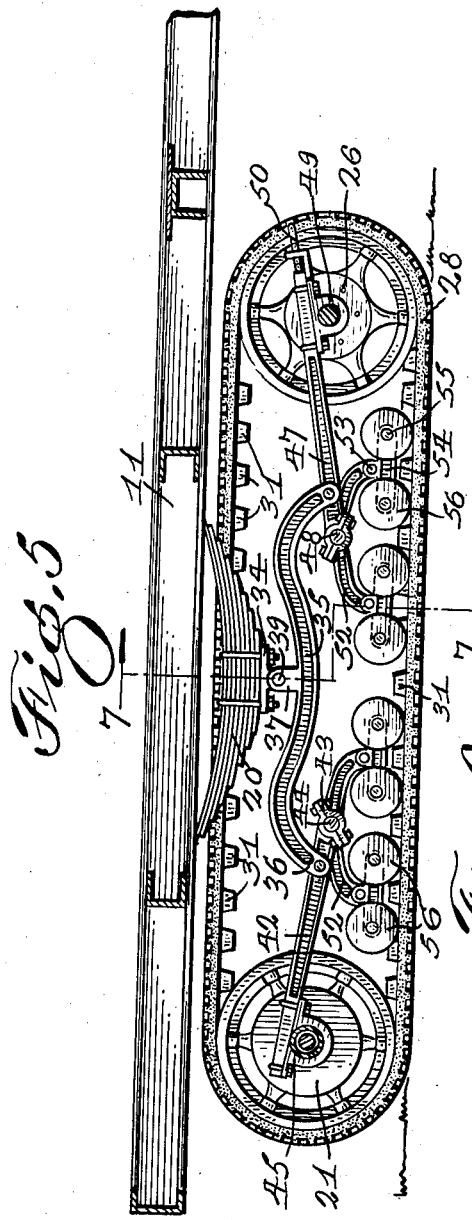
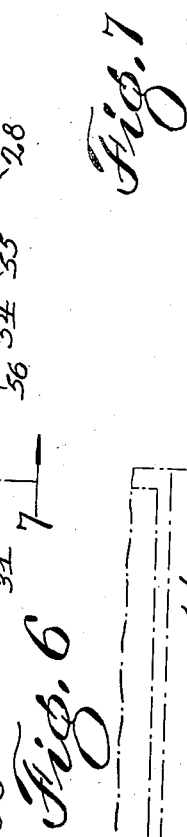
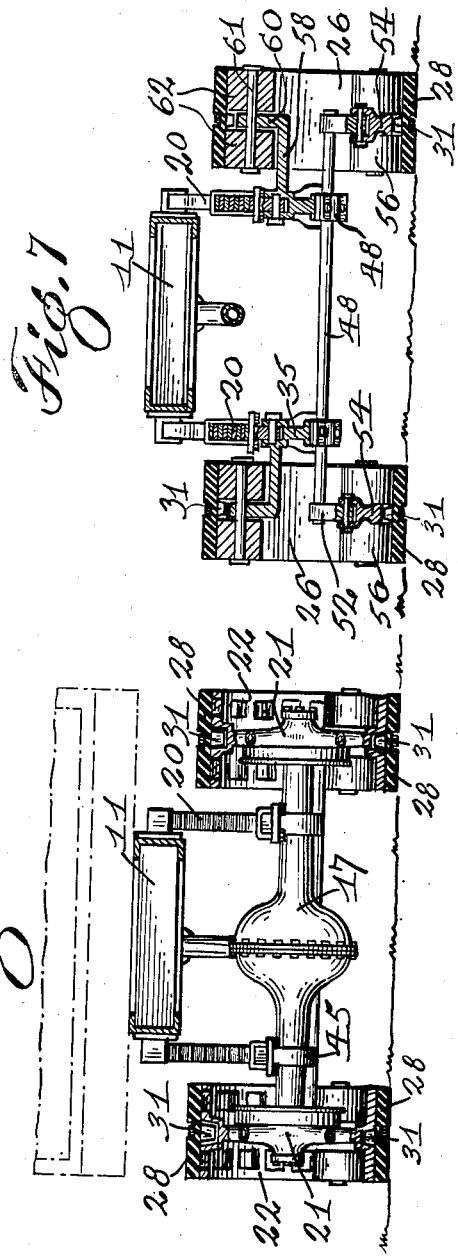
Inventor
Joseph A. Landry
By Robic & Bastien
Attorneys Patented Dec. 3, 1940

2,223,490

UNITED STATES PATENT OFFICE 2,223,490

TRACK LAYING VEHICLE

Joseph A. Landry, Mont Joli, Quebec, Canada

Application April 22, 1939, Serial No. 269,394

4 Claims. (Cl. 180—9.1)

The present invention relates to improvements in track laying motor vehicle construction.

An object of the invention is the provision of a track laying vehicle of generally improved design.

Another object of the invention is the provision of a track laying vehicle having a highly flexible track engaging support structure which readily conforms to inequalities of the ground.

A further object of the invention is the provision of a track laying vehicle having support means of the aforesaid character which is very strong and durable.

Still another object of the invention is the provision of a track laying vehicle of the above character which is highly efficient in operation.

Other objects and advantages of the invention will become apparent as the description progresses.

In the accompanying drawings forming a part of this specification and in which like reference characters are employed to designate corresponding parts throughout the same:

Figure 1 is a side elevational view of the vehicle,

Figure 2 is a side elevational view of the rear portion of the vehicle in one position, Figure 3 is a similar view showing the mechanism in another position, Figure 4 is a plan view of the lower rear portion of the vehicle, Figure 5 is a longitudinal section taken on the line 5—5 of Figure 4, Figure 6 is a transverse section taken on the line 6—6 of Figure 4, Figure 7 is a section taken on the line 7—7 of Figure 5, Figure 8 is a fragmentary detail elevational view of the track belt, and Figure 9 is a fragmentary sectional view through the belt.

Referring to the drawings, wherein for the purpose of illustration is shown a preferred embodiment of the invention, 10 generally designates the vehicle which is of the type ordinarily constructed for wheeled vehicles embodying a chassis frame 11, a cabin 12 and a motor enclosing hood 13.

On the conventional front spindles 15 are mounted runners 16, of any preferred well-known character, adapted for operation upon snow or ice covered ground. At the rear of the chassis is provided a conventional rear axle transmission mechanism 17 driven by a propeller shaft 18.

The rear spring suspension embodies a pair of longitudinally directed semi-elliptic spring members 20 secured to the frame 11 in a position forwardly of the rear axle. The conventional rear driving wheels are removed from the driving axle and are replaced by a pair of special wheels 21 having a hub, spoke and brake structure corresponding to the conventional wheels and provided with a relatively wide annular felly 22 formed to provide on the circumferential centre portion a plurality of sockets 23. The side flanges of the felly may likewise be apertured, as indicated at 24, to allow the snow to clear off.

At a position spaced forwardly of each of the two drive wheels 21 is provided a similar wheel 26 fitted on the end portion of a transversely extending shaft 27. Over the complementary wheels 21 and 26, at each side of the rear portion of the vehicle, is trained an endless track belt 28, in the form of a relatively wide continuous flexible band, of rubber or the like. In the outer face of each of these endless track members is formed a longitudinal centrally arranged channel 29, while the surface of the raised portion at each side is preferably provided with zigzag grooves 30 to furnish a suitable tread. To the inner side or face of each belt 28, directly opposite the channel 29, are secured a plurality of tooth forming blocks 31, of elongated tapering form. These blocks are securely fastened to the track belt at predetermined spaced intervals by bolts 32 and are adapted to engage the sockets in the wheels 21 and 26.

To a bracket 34 secured to the bottom central part of each spring 20 is connected a support lever 35 curved so that its ends 36 are directed downwardly while the main intermediate body portion is bowed downwardly, as shown to advantage at Figure 5. A pivot knuckle 37 formed at the centre of the longitudinally extending lever bar 35 is connected by a pin 39 with an eye on the bracket 34 to provide an oscillatory connection.

The rear end of each oscillatory bar 35, which is preferably formed with a pivot knuckle, spans and pivotally connects with the intermediate portion of an oscillating lever 42. This lever is in the form of a straight tapered bar having the heavier inner end provided with a bearing 43 rotatably engaging a transverse shaft 44. The opposite outer end portion of this lever is journalled on the housing of the rear drive shaft by a bearing 45. (See Fig. 5.)

The forward end of each bar 35 is pivotally connected with a front lever 47, similar to the rear levers 42, having its inner end connected with a shaft 48 by a bearing and its outer end on a bearing 49 on the front wheel shaft 27. This bearing clamp 49 is adapted to slidably engage the forward end of the bar which is adjustable thereon by a screw 50 to enable the tension of the track belt to be regulated.

On the outer end portions of the shafts 44 and 48 are mounted arcuate frame members 52 having their medial portions pivotally connected with said shafts 44 and 48 and formed of strong bar material. The downwardly directed end portions of these arcuate frame members are connected, through the medium of pivot connections 53, to truck sections or bogies 54. Each of these sections is formed at the ends with bearing sleeves engaging the intermediate parts of transversely extending roller shafts 55. On the opposite portions of the shafts 55 are rotatably fitted rollers 56 arranged in transversely spaced pairs and disposed to rest and roll on the inner face of the track 28 at each side of the teeth 31.

Formed integral with and projecting laterally outward of each knuckle 37 is a bracket leg 58 having a right angular upstanding leg 60 at its outer end. The leg 60 is apertured to receive a transversely disposed shaft 61 having a pair of rollers 62 rotatably fitted thereon. These rollers are arranged to engage and support the upper reach of the track and to obviate whipping thereof when the vehicle is in motion. Said rollers are shown in section in Fig. 7, but cannot be seen in the other side views, as they are hidden from view behind spring 20.

This construction provides a highly flexible support and drive mechanism. The rear pair of wheels 21 secured on the axle shaft driven by the vehicle motor, which drive the two endless track belts 28, the forward complementary idler wheels 26 over which the tracks are trained, and the intermediate rollers 56 are so arranged and connected as to furnish efficient traction. The supporting and connecting levers and trucks are adapted to maintain the intermediate rollers in effective contact with the tracks as the great flexibility thereof is designed to enable these rollers to conform to road inequalities, as shown to advantage at Figures 1 to 3 inclusive. Thus, the rolling support is effectively distributed between the roller trucks and the comparatively large wheels by the levers 42 and 47 to which are connected the ends of the main support bars 35.

It is to be understood that the form of my invention herein shown and described is to be taken as a preferred example of the same, and that various changes as to the shape, size and arrangement of parts may be resorted to without departing from the spirit of the invention or the scope of the subjoined claims.

Having thus described my invention, I claim:

1. In a motor vehicle having a frame and a motor driven shaft, a pair of drive wheels secured on the said shaft, an auxiliary shaft having a pair of idler wheels mounted thereon, an endless track trained over each drive wheel and complementary idler wheel, a plurality of roller trucks mounted on each track between the wheels, means for pivotally coupling together each adjacent pair of trucks, a plurality of levers connecting the wheel shafts with the roller truck coupling means, a spring attached to the frame at each side, a support and tying lever pivoted centrally to the spring and pivoted at each end to one wheel shaft lever to insure the proper positioning of said wheel shaft levers and trucks, and means for adjusting the length of the auxiliary wheel shaft levers.

2. In a motor vehicle having a frame and a motor driven shaft at the rear of the frame, a pair of drive wheels secured on the said shaft, an auxiliary shaft arranged forward of and parallel with the motor driven shaft, a pair of idler wheels on the said auxiliary shaft, an endless track trained over each drive wheel and a complementary idler wheel and driven by the said drive wheel, a plurality of roller trucks disposed on the lower reach of each track, a frame member connecting the said trucks in pairs, a plurality of levers connecting the wheel shafts with adjacent pairs of roller trucks, a spring attached to the vehicle frame at each side, and a support member pivotally connected with each spring and with the said levers.

3. In a motor vehicle having a frame and a motor driven shaft at the rear of the frame, a pair of drive wheels secured on the said shaft, an auxiliary shaft arranged forward of and parallel with the motor driven shaft, a pair of idler wheels on the said auxiliary shaft, an endless track trained over each drive wheel and a complementary idler wheel and driven by the said drive wheel, a plurality of roller trucks disposed on the lower reach of each track, a frame member connecting the said trucks in pairs, a plurality of levers connecting the wheel shafts with adjacent pairs of roller trucks, a spring attached to the vehicle frame at each side, and an oscillatory lever having its centre portion pivotally connected with each spring and its end portions pivotally connected with intermediate parts of the levers.

4. In a motor vehicle having a frame and a motor driven shaft, a pair of drive wheels secured on the said shaft, an auxiliary shaft having a pair of idler wheels and disposed parallel to and forward of the driven shaft, an endless track trained over each drive wheel and complementary idler wheel, a plurality of roller trucks mounted on each track between the wheels, arcuate members pivotally connecting together adjacent pairs of trucks, a pivoted lever extending from the driven shaft and auxiliary shaft respectively to connect one arcuate member with each of said shafts, a tying and support lever connecting together the complementary pivoted levers, pivoted means for tying the center of said tying and support lever to frame springs, and means on each auxiliary shaft lever for adjusting the length thereof and, hence, the length of each endless track.

J. AD. LANDRY.